United States Patent
Cruanes et al.

(10) Patent No.: US 11,163,768 B1
(45) Date of Patent: Nov. 2, 2021

(54) CHECKPOINTS IN BATCH FILE PROCESSING

(71) Applicant: Snowflake Inc., San Mateo, CA (US)

(72) Inventors: Thierry Cruanes, San Mateo, CA (US); Igor Demura, San Mateo, CA (US); Varun Ganesh, San Mateo, CA (US); Prasanna Rajaperumal, San Mateo, CA (US); Libo Wang, Foster City, CA (US); Jiaqi Yan, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 16/889,042

(22) Filed: Jun. 1, 2020

(51) Int. Cl.
| | |
|---|---|
| *G06F 16/2453* | (2019.01) |
| *G06F 9/48* | (2006.01) |
| *G06F 16/14* | (2019.01) |
| *G06F 16/16* | (2019.01) |
| *G06F 16/11* | (2019.01) |

(52) U.S. Cl.
CPC ........ *G06F 16/24542* (2019.01); *G06F 9/485* (2013.01); *G06F 16/122* (2019.01); *G06F 16/148* (2019.01); *G06F 16/162* (2019.01); *G06F 16/24539* (2019.01)

(58) Field of Classification Search
CPC ............. G06F 16/24542; G06F 16/162; G06F 16/24539; G06F 16/122; G06F 16/148; G06F 9/485
See application file for complete search history.

(56) References Cited

U.S. PATENT DOCUMENTS

| | | | |
|---|---|---|---|
| 2011/0302583 A1* | 12/2011 | Abadi et al. | G06F 9/46 |
| 2014/0280036 A1 | 9/2014 | Korlapati et al. | |
| 2015/0089274 A1* | 3/2015 | Mares et al. | G06F 11/2007 |
| 2015/0234688 A1 | 8/2015 | Dageville et al. | |
| 2017/0116210 A1* | 4/2017 | Park | G06F 9/542 |
| 2019/0087440 A1* | 3/2019 | Johnson | G06F 16/185 |
| 2019/0236194 A1 | 8/2019 | James et al. | |
| 2019/0303479 A1 | 10/2019 | Behm et al. | |
| 2020/0050694 A1 | 2/2020 | Avalani et al. | |
| 2020/0192900 A1 | 6/2020 | Sung et al. | |

OTHER PUBLICATIONS

"U.S. Appl. No. 16/889,033, Examiner Interview Summary dated Oct. 30, 2020", 3 pgs.
"U.S. Appl. No. 16/889,033, Non Final Office Action dated Jul. 24, 2020", 23 pgs.
"U.S. Appl. No. 16/889,033, Response filed Oct. 22, 2020 to Non Final Office Action dated Jul. 24, 2020", 11 pgs.
"U.S. Appl. No. 16/889,033, Final Office Action dated Nov. 12, 2020", 27 pgs.
"U.S. Appl. No. 16/889,033, Response filed Feb. 12, 2021 to Final Office Action dated Nov. 12, 2020", 11 pgs.
"U.S. Appl. No. 16/889,033, Non-Final Office Action dated Apr. 19, 2021", 28 pgs.

\* cited by examiner

*Primary Examiner* — Aleksandr Kerzhner
*Assistant Examiner* — Maher N Algibhah
(74) *Attorney, Agent, or Firm* — Schwegman Lundberg & Woessner, P.A.

(57) ABSTRACT

Embodiments of the present disclosure may provide a dynamic query execution model with fault tolerance and failure recovery techniques. Embodiments of the present disclosure may utilize checkpoints to map processed output files to their corresponding input files. Therefore, if an error occurs in processing one or more files, the system may only need to reschedule processing of selected file(s).

24 Claims, 14 Drawing Sheets

CHECKPOINTS IN BATCH FILE PROCESSING

TECHNICAL FIELD

The present disclosure generally relates to scalable query processing using parallel processing.

BACKGROUND

As the world becomes more data driven, database systems and other data systems are storing more and more data. For a business to use this data, different operations or queries are typically run on this large amount of data. Some operations, such as those including large table scans, can take a substantial amount of time to execute on a large amount of data. The time to execute such operations can be proportional to the number of computing resources used for execution, so time can be shortened by using more computing resources.

To this end, some data systems can provide a pool of computing resources, and those resources can be assigned to execute different operations. However, in such systems, the assigned computing resources typically work in conjunction (for example as a process group). Hence, their assignments are fixed and static. Because the assigned computing resources work together to execute the operation, they are typically assigned their respective part at the outset, e.g., roles and assignments are fixed ahead of time. Therefore, these systems are not flexible regarding dynamic changes in the number of available resources.

Moreover, these systems cannot track the performance of all of the computing resources. Therefore, in the event of an error with one of the computing resources, the entire job would have to be re-performed, wasting time and resources.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure may provide a dynamic query execution model. This query execution model may provide acceleration by scaling out parallel parts of a query (also referred to as a fragment) to additional computing resources, such as those leased from a pool of computing resources. Execution of the parts of the query may be coordinated by a parent query coordinator (where the query originated) and a fragment query coordinator. Files for the query may loaded in a shared file queue as a continuous scanset, from which the parent query coordinator and fragment coordinator can request batches of files serially (e.g., one at a time) as they complete processing their currently assigned batch. The fragment computing resources may generate materialized results and load them into another shared file queue. The materialized results may be consumed by the parent query coordinator subsequent to all files in the continuous scanset being processed. This query execution model therefore provides increased speed as well as flexibility, especially when the number of resources can dynamically change during the query execution.

Figure 1:
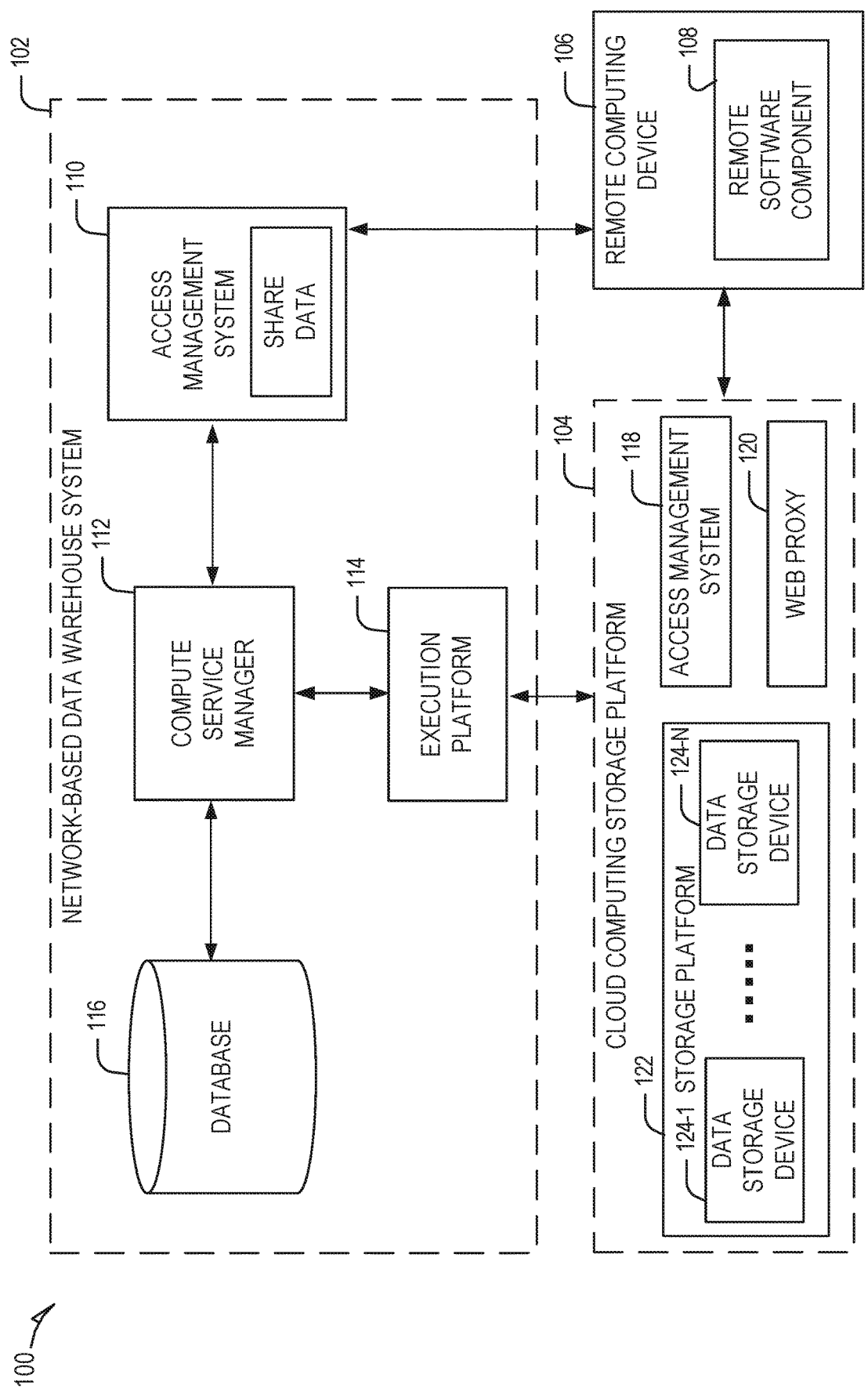
FIG. 1 illustrates an example computing environment in which a network-based data warehouse system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
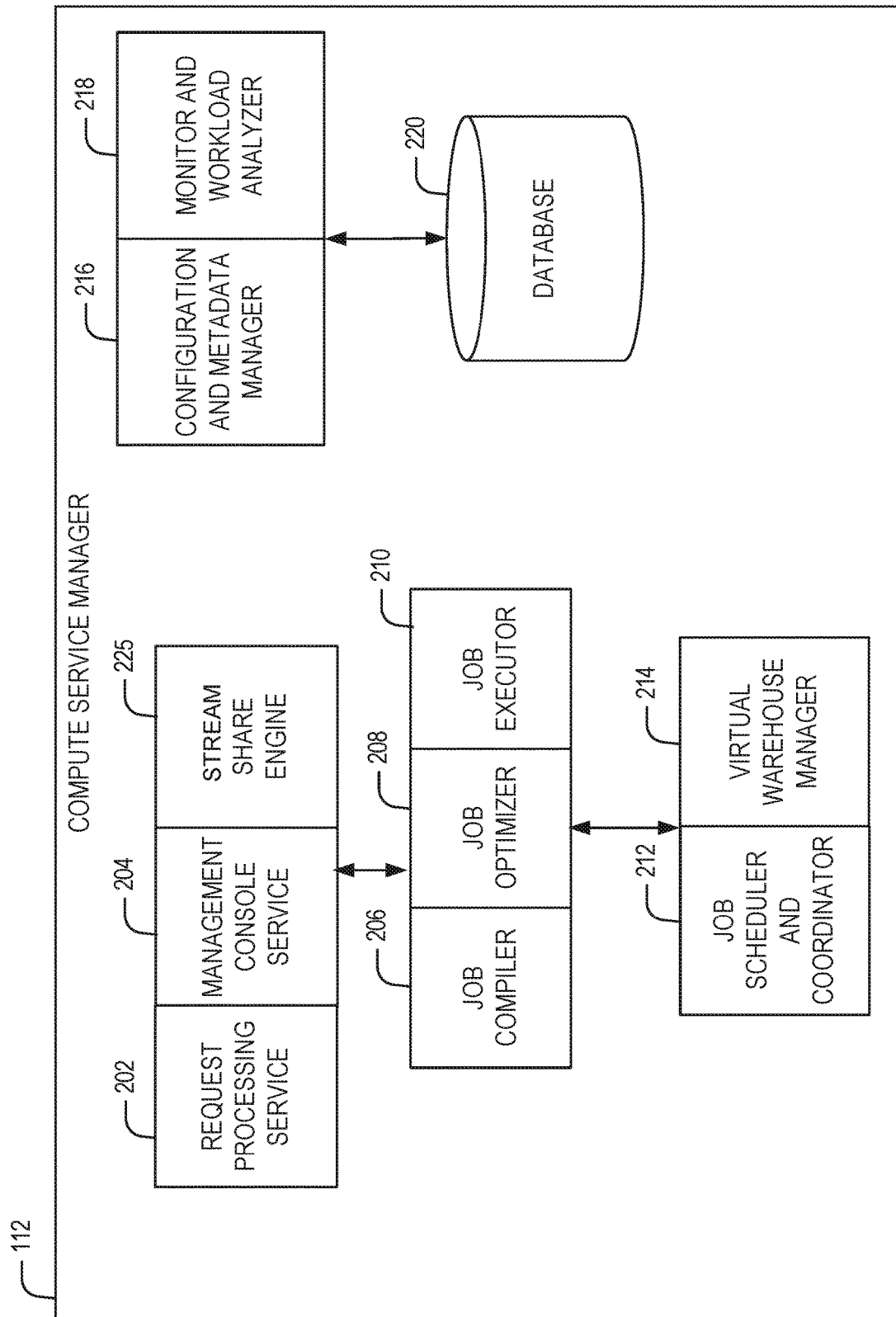
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
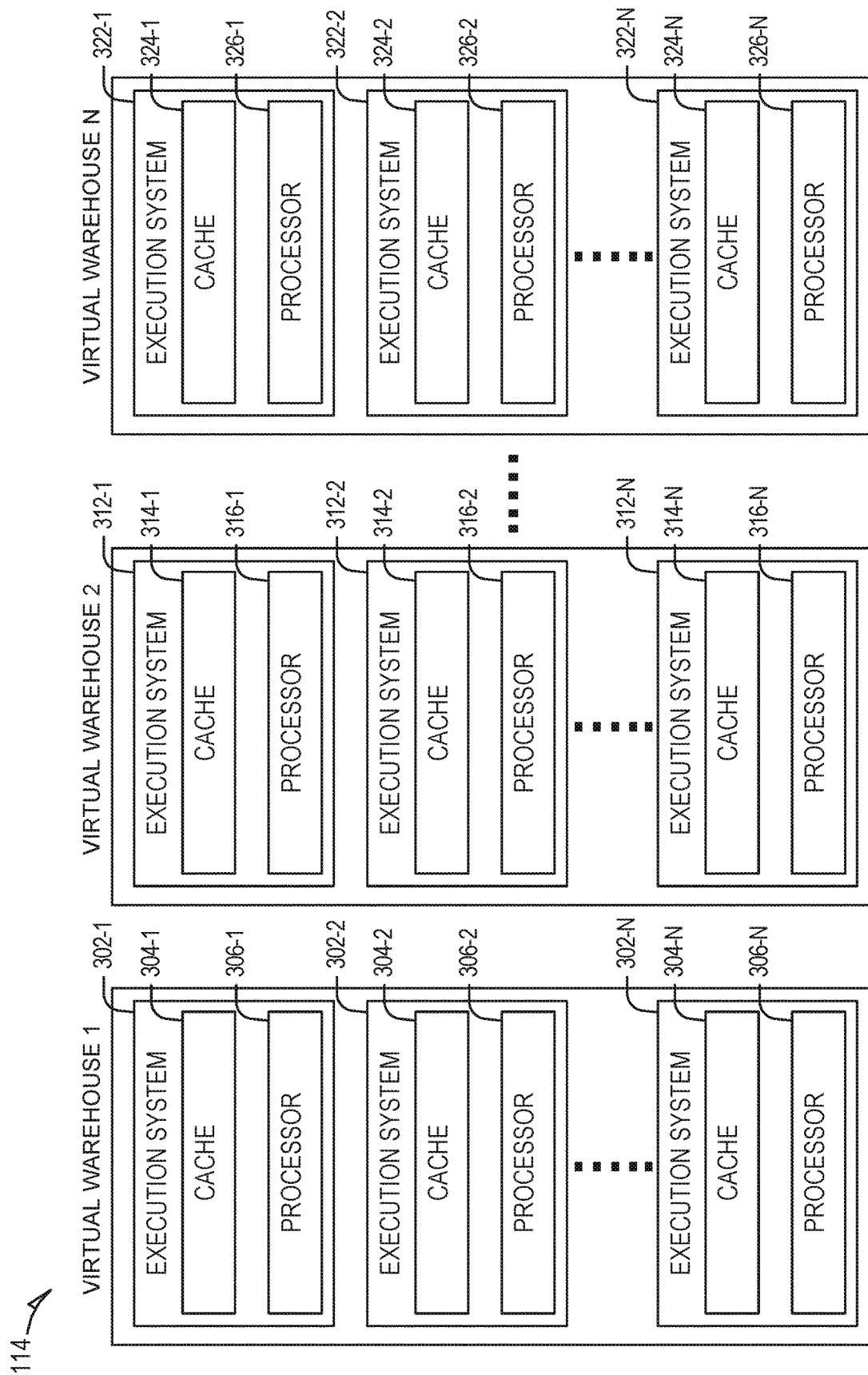
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
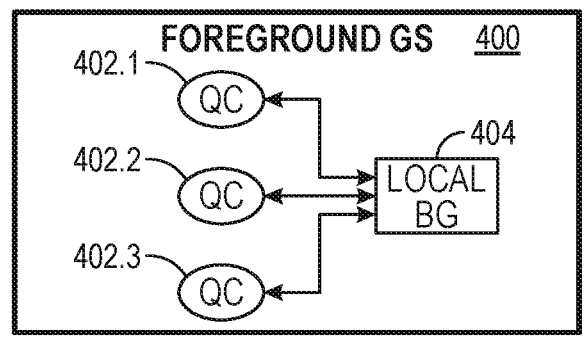
FIG. 4 is a block diagram illustrating a foreground global service, according to some example embodiments.

FIG. 4 shows an example foreground global service (GS) 400, according to some example embodiments. The foreground GS 400 may receive query requests and develop query plans to execute the query requests. The foreground GS 400 may broker requests to computing nodes or resources that execute a query plan, as explained in further detail herein. The foreground GS 400 may include query coordinators (QCs) 402.1-402.3, which are coupled to a local background service (BG) 404. In an embodiment, the foreground GS 400 may be defined for a particular type of service, such as copy, ingest, compute, large table scan, and so forth. The QCs 402.1-402.3 may receive query requests from different sources, which may have different account IDs. For certain operations, such as those involving multiple computing resources working together to execute different portions of an operation (e.g., large table scans), the source may be defined at a data warehouse level granularity. The QCs 402.1-402.3 may communicate information regarding the query requests and their sources to the local BG 404.

As explained in further detail below, the local BG 404 may assign computing resources (also sometimes referred to as execution platforms (XP)) to the QCs 402.1-402.3. The computing resources may be computing nodes allocated to the foreground GS 400 from a pool of computing resources. In an embodiment, the computing resources may be machines, servers, and/or processors. In an embodiment, the computing resources may be processing cores of a machine. Upon receiving their assignments of computing resources, the QCs 402.1-402.3 may communicate directly with the assigned computing resources to execute respective query plans.

The number of assigned computing resources may vary and change dynamically, even during execution of a query. For example, the number of assigned computing resources may be dynamically allocated using the techniques described in U.S. patent application Ser. No. 16/874,388, entitled "Flexible Computing," filed on May 14, 2020, which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

Figure 5:
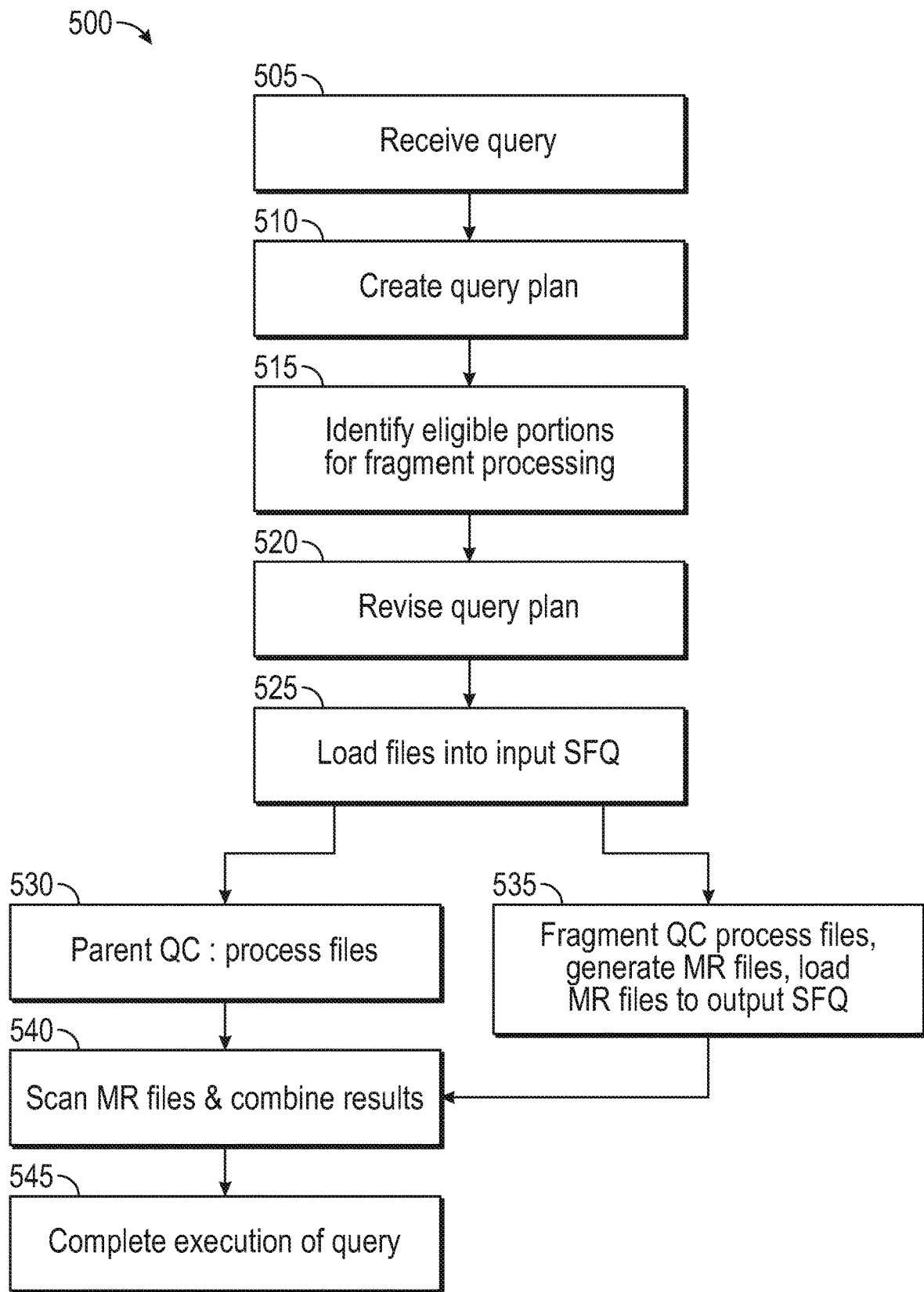
FIG. 5 shows a flow diagram for executing a query, according to some example embodiments.

FIG. 5 shows a flow diagram of a method 500 for executing a query by a foreground GS, according to some example embodiments. In an embodiment, a QC within the foreground GS may perform portions of the method 500. At operation 505, the QC or foreground GS may receive a query request to be run on a data set, such as a table. The QC receiving the query may be referred to as a parent QC. At operation 510, the parent QC may create a query plan to execute the received query. The query plan may include a plurality of operators and links connecting the operators; the links may define how the results of one operator are communicated to the next operator.

Figure 6:
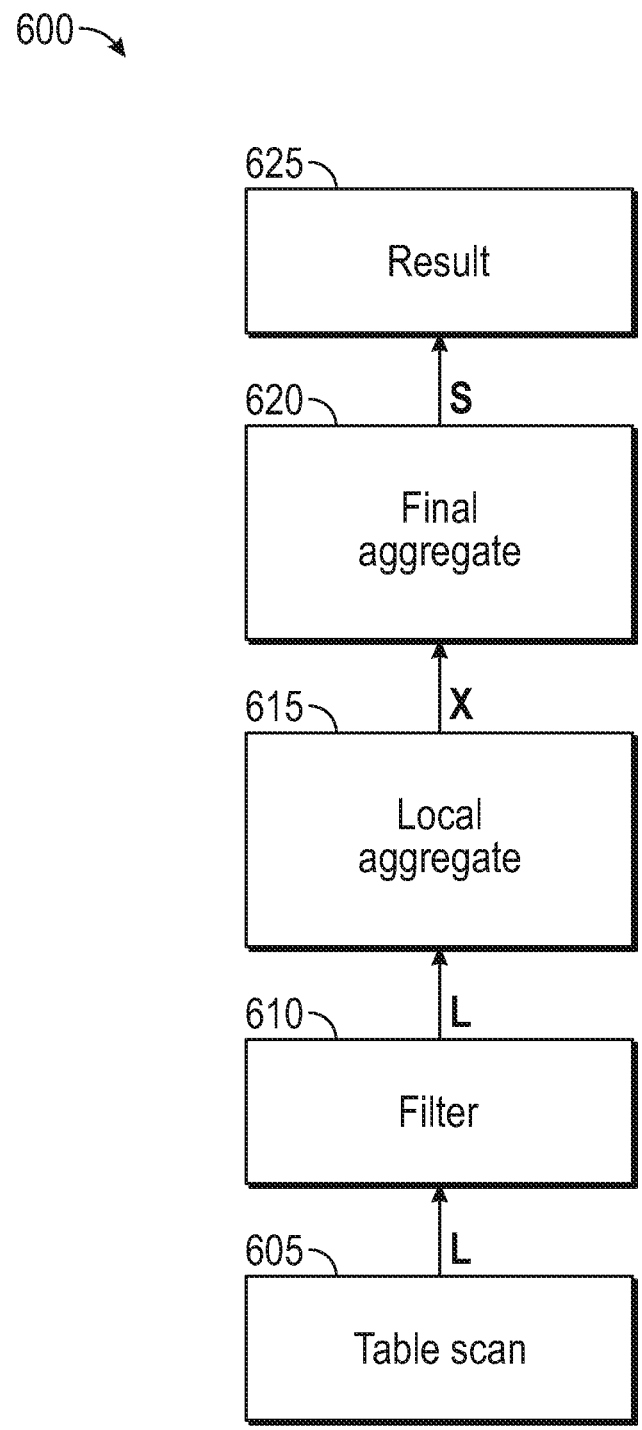
FIG. 6 shows an example of a query plan, according to some example embodiments.

FIG. 6 illustrates an example query plan 600, according to some example embodiments. The query plan 600 is shown for a filter-aggregate query type for illustration purposes only, and the query plan 600 may be other types of queries as explained below. The query plan 600 may include a plurality of operators to execute the query: a table scan operator 605, a filter operator 610, a local aggregation operator 615, a final aggregation operator 620, and a result operator 625. The operators may be connected by links, shown in the example as "L," "X," and "S" types. As shown, the results of the table scan operator 605 may be communicated using a local link ("L" link) to the filter operator 610. That is, a computing resource may perform the table scan operator 605, filter operator 610, and local aggregation operator 615 without communicating with another computing resource. In contrast, the results of the local aggregation operator 615 may be communicated using an exchange ("X" link) with the final aggregation operator 620. And results of the final aggregation operator 610 may be communicated using a single link ("S" link) to the result operator 625. Both the exchange and single link may require communication between computing resources; thus, those connected operators may not be performed by an independent computing resource without communicating with other resources.

Returning to method 500 of FIG. 5, after a query plan is created, eligible portions of the query plan for fragment processing may be identified at operation 515. A fragment refers to parts of a query plan that may be performed using additional computing resources in parallel (and in isolation), i.e., a parallelizable part of a query plan. A set of criteria may be used to identify a portion or portions of the query plan that may be eligible for fragment processing. In an embodiment, a piece of a plan, which may include an operator or set of operators, with only local links may be eligible for fragment processing. Additionally, that operator or set of operators may begin with a table scan operation to be eligible for fragment processing. Because only local links connect the identified operations, the computing resource may execute those identified operations without communicating with other resources, thereby making it eligible for fragment processing. For example, those operations may include operations that can be executed locally by a computing resource on a data in a database, data set, a micropartition, or the like. Examples of such operators may include, but are not limited to, tables can, filter, child aggregation, projection, bloom filter, and so forth.

Consider the example of query plan 600 of FIG. 6. There, the first three operators (the table scan operator 605, the filter operator 610, and the local aggregate operator 615) may be eligible for fragment processing because they are connected by local links, i.e., they can be performed by a computing resource independently without communicating with other computing resources, and begin with a table scan operator.

Another criterion for fragment processing eligibility may be increased processing speed. That is, the criterion may be based on whether using fragment processing with additional computing resources would yield faster execution as compared to normal execution (i.e., without fragment processing). In an embodiment, this determination may not rely on a minimum number of additional computing resources because that number may be dynamic and change during the execution of the query as explained above. Because of the dynamic nature of the number of computing resources, the speed of query processing may not be static or defined, but may be dependent on the number of available computing resources. Thus, the time for executing the same query using fragment processing may vary at different times depending on the number of available computing resources at the time of execution.

Other criterion for fragment processing eligibility may also be used to determine eligibility for fragment processing, such as the size of the table scan, the output to input ratio, availability of leased computing resources, and so forth. Larger table scans may be more appropriate for fragment processing. Output to input ratio refers to the size of the output of the fragment processing as compared to the input of the fragment processing. As explained below, the output of the computing resources is not directly pipelined into the parent QC, but may be provided in the form of materialized results, which the parent scans (e.g., parent job execution platform machine). Hence, the output may refer to the size of the materialized result and the input may refer to the size of the input files used to generate the materialized result. The smaller the output to input ratio, the more appropriate that portion of the query plan may be for fragment processing.

At operation 520, the query plan may be revised to add fragment processing for the identified operations of the original query plan. A query may include multiple fragments. For the sake of clarity and brevity, an example case of a query plan with a single fragment is described next, but it should be understood that these teachings can be extended to multiple fragments in a query plan.

Figure 7:
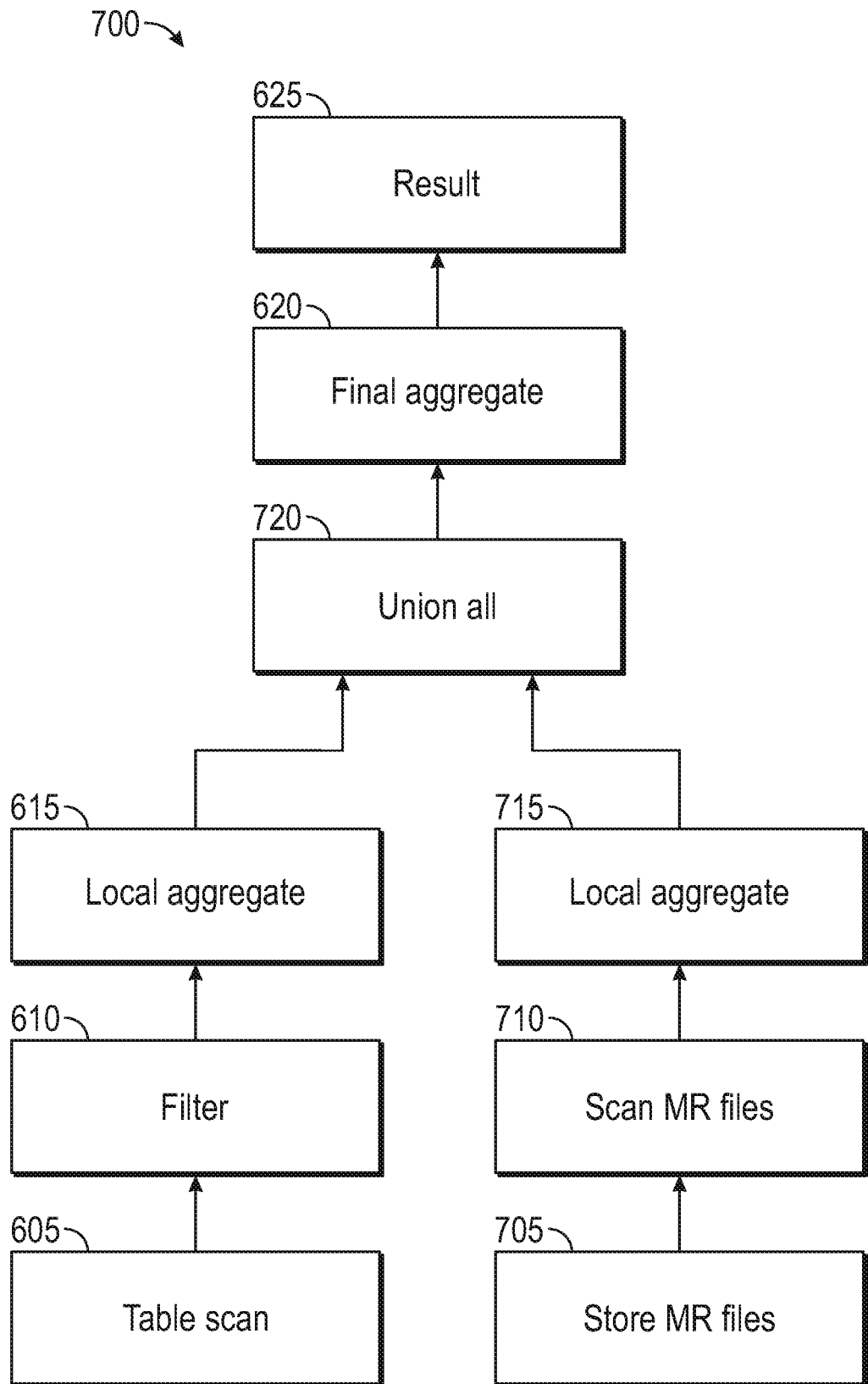
FIG. 7 shows an example of a revised query plan, according to some example embodiments.

FIG. 7 illustrates a revised query plan 700 with fragment processing for the query plan 600, according to some example embodiments. As discussed above, operators 605-610 may have been identified for fragment processing. Therefore, for certain files or batches of files, operators 605-610 may be performed by the parent QC, as explained above. Those operations may also be concurrently performed by a fragment QC using additional computing resources (e.g., leased computing resources). The parent QC and fragment QC may be provided as different QCs but may scan the same table (e.g., operator 605). They may scan different aspects or portions of the table as explained below. The fragment QC may receive and execute the fragment steps (e.g., operators 605-615) of the revised query plan.

The output of those operators by fragment processing may be provided as materialized results and may be stored, as shown in operation 705. For example, the materialized results may be stored in a storage location, such as a cloud storage, and a materialized result file list may be stored in a memory (e.g., an output shared file queue). As such, fragment computing resources may not need to communicate with the parent QC or with each other. The fragment computing resources may not be directly linked to the parent QC so that their operations may be independent of other components.

The revised query plan 700 may also include a scan operator 710 for scanning the stored materialized results by the parent QC; a local aggregation operator 715 for aggregating the scanned materialized results; and a union all operation 720 for joining the results of operators 605-615 performed by the parent QC and the results of local aggregation 715 (e.g., aggregated scanned materialized results). In an embodiment, the union all operation 720 may first consume the results from the left branch (operators 605-615) and after that, it may consume the results of the right branch (operators 705-715). By starting with the left branch related to the parent query and then switching to processing the materialized results from the right branch, the revised query plan ensures that all files in the continuous scanset are processed and there is no performance penalty for using fragment processing.

Moreover, aggregating the materialized results locally at operator 715 first may reduce the amount of data needed for union all operator 720. Hence, this local aggregation may provide another opportunity to reduce data, as fragment processing may have a small reduction factor. The revised query plan 700 may also include remaining portions of the query plan 600, e.g., the final aggregation operator 620 and a result operator 625, as discussed above.

Returning again to method 500 in FIG. 5, the revised query plan may then be executed. At operation 525, files from the data set may be loaded as a continuous scanset in an input shared file queue (SFQ) to facilitate parent and fragment processing. The input SFQ may be provided in a memory accessible by the parent QC and fragment QC. As described in further detail below (with reference to FIG. 8), at operations 530 and 535, the input SFQ may provide files from the continuous scanset to both the parent and fragment QCs for processing in a serial fashion, e.g., one or more batches at a time. Using batches, which are a set of files, may reduce the amount of REST calls from the fragment computing resources. The parent QC may use its assigned computing resources (parent computing resources) to process its assigned files, and the fragment QC may use leased computing resources (fragment computing resources) to process its assigned files.

Assignment of files from the input SFQ may be performed in batches using a continuous scanset instead of fixed assignments. That is, both the parent and fragment QCs (and their computing resources) may be coupled to the input SFQ, and the computing resources for each of the parent and fragment QCs may request a batch of files (e.g., a group of files) from the input SFQ when they have availability (e.g., when they have completed processing their currently assigned batch). The parent QC may coordinate with its assigned computing resources to execute assigned batch(es), and the fragment QC may coordinate with its assigned computing resources to execute its assigned batch(es). The input SFQ may assign the next batch to the requesting computing resource for a respective QC. A QC's computing resource, for example, may request a next batch after it has processed its current batch and when it has availability to process a next batch. For example, the SFQ may assign a batch of files to respective computing resources for each of the parent and fragment QCs and then assign subsequent batches to the computing resources for each of the QCs upon requests until all files in the continuous scanset have been assigned.

This batching technique provides flexibility as the number of fragment computing resources may increase or decrease during a query execution. This batching technique, as opposed to fixed assignment techniques, does not rely on the availability of all computing resources for the entire duration of the query execution. For example, in the event fragment computing resources become unavailable during the query execution, the parent QC (and its computing resources) may continue processing the files in the continuous scanset. That is, if the fragment QC (and its computing resources) can no longer process any more batches, the parent QC (and its computing resources) may continue its batch processing (one at a time) until all files in the continuous scanset are processed. Therefore, the results of the execution will remain the same, but the time to execute the query may increase when fragment computing resources are lost during the execution of the query (as compared to the time when the fragment computing resources are available).

Also, at operation 535, the results of the fragment processing may be provided as materialized results, which are stored in a storage area (e.g., cloud storage), and the file list for the materialized results (e.g., URLs) may be stored in an output SFQ, where they are available for the parent QC to access. At operation 540, after the entire continuous scanset (e.g., the files in the input SFQ) has been processed by the computing resources for the parent and/or fragment QC, the parent QC computing resource may read or scan the materialized results, process the scanned materialized results, and combine them with the batch results of the files processed by the parent QC (e.g., operators 705-720 of the revised query plan in FIG. 7). At operation 545, the parent QC may complete coordination of the execution of the query and provide results. For example, the parent QC may coordinate the execution of any remaining portions of the revised query plan (e.g., operators 620 and 625 of FIG. 7) on the combined results.

Figure 8:
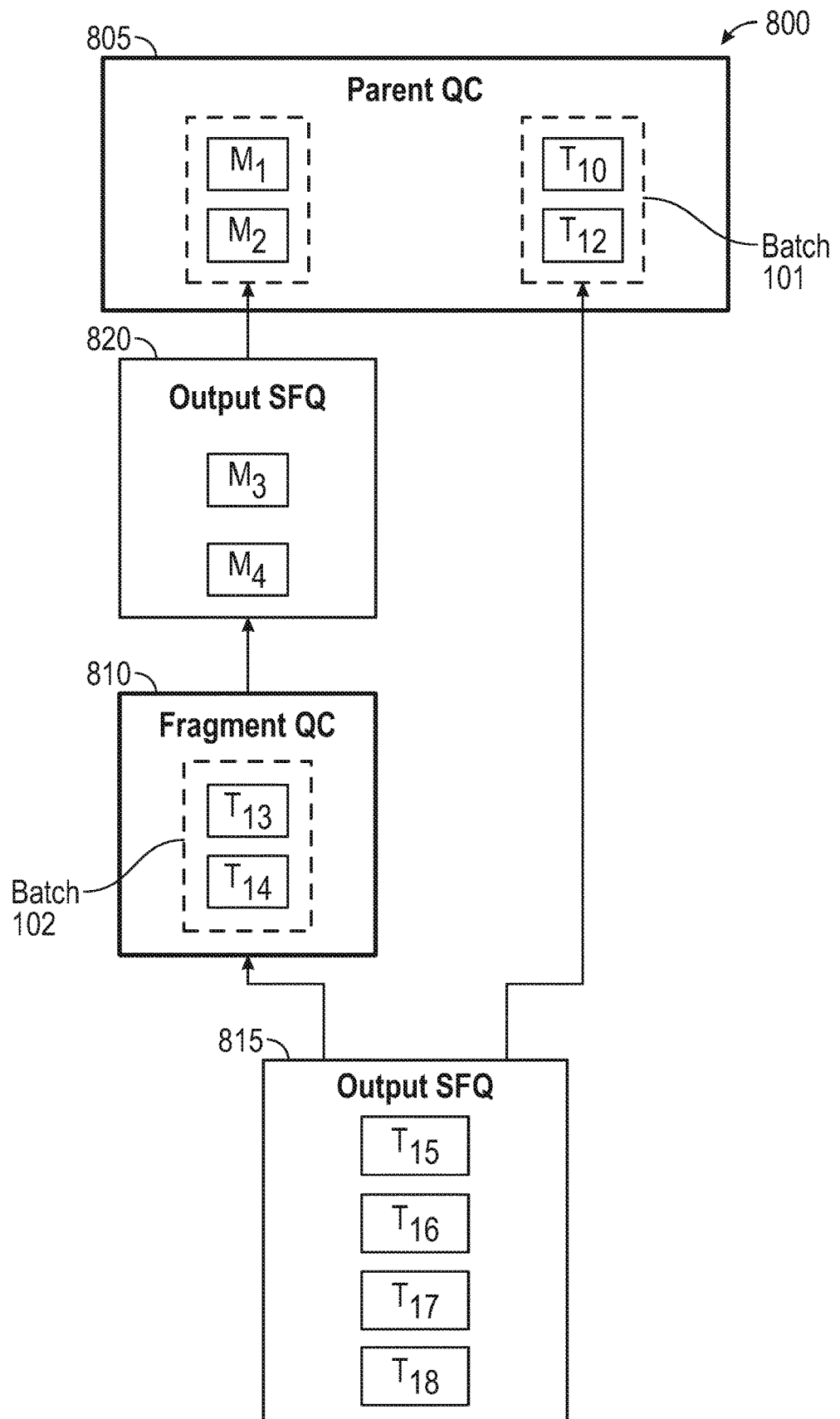
FIG. 8 is a block diagram of a query processing system, according to some example embodiments.

FIG. 8 shows an example of a query processing system 800, according to some example embodiments. The query processing system 800 may include a parent QC 805, a fragment QC 810, an input SFQ 815, and an output SFQ 820. In an embodiment, the input and output SFQ 815, 820 may be provided in a local memory accessible by the parent QC 805 and the fragment QC 810.

The parent QC 805 may create a query plan using fragment processing as described herein. The parent QC 805 may coordinate with its assigned computing resources to execute the query according to the query plan. The fragment QC 810 may coordinate with its assigned computing resources to execute the fragment portions of the query plan.

The scanset for the query may be divided into files and those files may be stored in the input SFQ 815 as a continuous scanset. The parent QC 805 and the fragment QC 810 may request files from the input SFQ 815 for processing. In response, the input SFQ 815 may combine a set of files in a batch, assign the batch a unique batch ID, and then assign or transfer that batch to the requesting QC.

In the example shown in FIG. 8, the parent QC 805 may have received batch 101 from the input shared queue 815; batch 101 includes files $T_{10}$ and $T_{11}$. When the parent QC 805 completes processing batch 101 and (its computing resource) generates results for that batch, it may request more files from the input SFQ 815. At that time, the input SFQ 815 may combine another set of files in a batch with its own unique batch ID and assign or transfer that batch to the parent QC 805.

Likewise, in the example shown in FIG. 8, the fragment QC 810 may have received batch 102 from the input SFQ 815; batch 102 includes files $T_{13}$ and $T_{14}$. When the fragment QC 810 completes processing batch 102, it may request more files from the input SFQ 815. At that time, the input SFQ 815 may combine another set of files in a batch with its own unique batch ID and assign or transfer that batch to the fragment QC 810. This process of requesting and processing batches serially by the parent and fragment QC may continue until all files in the continuous scanset are processed.

However, in the event the computing resources assigned to the fragment QC 810 (leased computing resources) have been recalled, the fragment QC may allow that computing resource to complete its processing of its current batch and may then release the recalled computing resources. Consequently, the fragment QC 810 may not request more files from the input SFQ 815 for that computing resource, and the parent QC 805 may be the only entity requesting and processing the files in the continuous scanset if there are no more fragment computing resources available. If additional computing resources are reallocated to the fragment QC 810 while the query is still being processed, it may then request files from the input SFQ 815 and may continue its parallel operation with the parent QC 805, as discussed above. Therefore, this scheme using a continuous scanset in an input SFQ provides robustness and flexibility in the processing of the files when the number of available computing resources may vary during execution of a query.

Unlike the parent QC 805 which processes its assigned batches and generates batch results, the fragment QC 810 may process its assigned batches and generates materialized results (which are stored in a storage area) and transmits materialized result (MR) file lists to the output shared queue 820. Each MR file may correspond to a single batch, and a MR file may not contain results from different batches. This allows tracking of batch processing and also allows for repeating processing of a specific batch in the event of an error, as described in further detail below. However, an input batch may result in the output of several MR files. For example, if an input batch is large and the output does not fit into one MR file, the output may be divided into several MR files.

The parent QC 805 may access the materialized results identified in the output SFQ 820. The parent QC 805 through its computing resource(s) may process the materialized results (e.g., table scan) and may combine them with the results of its processing of files from the input SFQ 815 (e.g., batch results) to complete execution of the query. In an embodiment, the computing resource(s) of the parent QC 805 may begin scanning the materialized results identified in the output SFQ 820 after all files in the continuous scanset are processed.

Another benefit of fragment processing is that it may provide more fault tolerance and more robust failure recovery techniques. By mapping materialized results with their input batches, the system can track which input files generated which results. Therefore, if there is an error in the processing, such as a fragment computing resource failing, the system may only need to reschedule the batch(es) provided to the failed resource.

Figure 9:
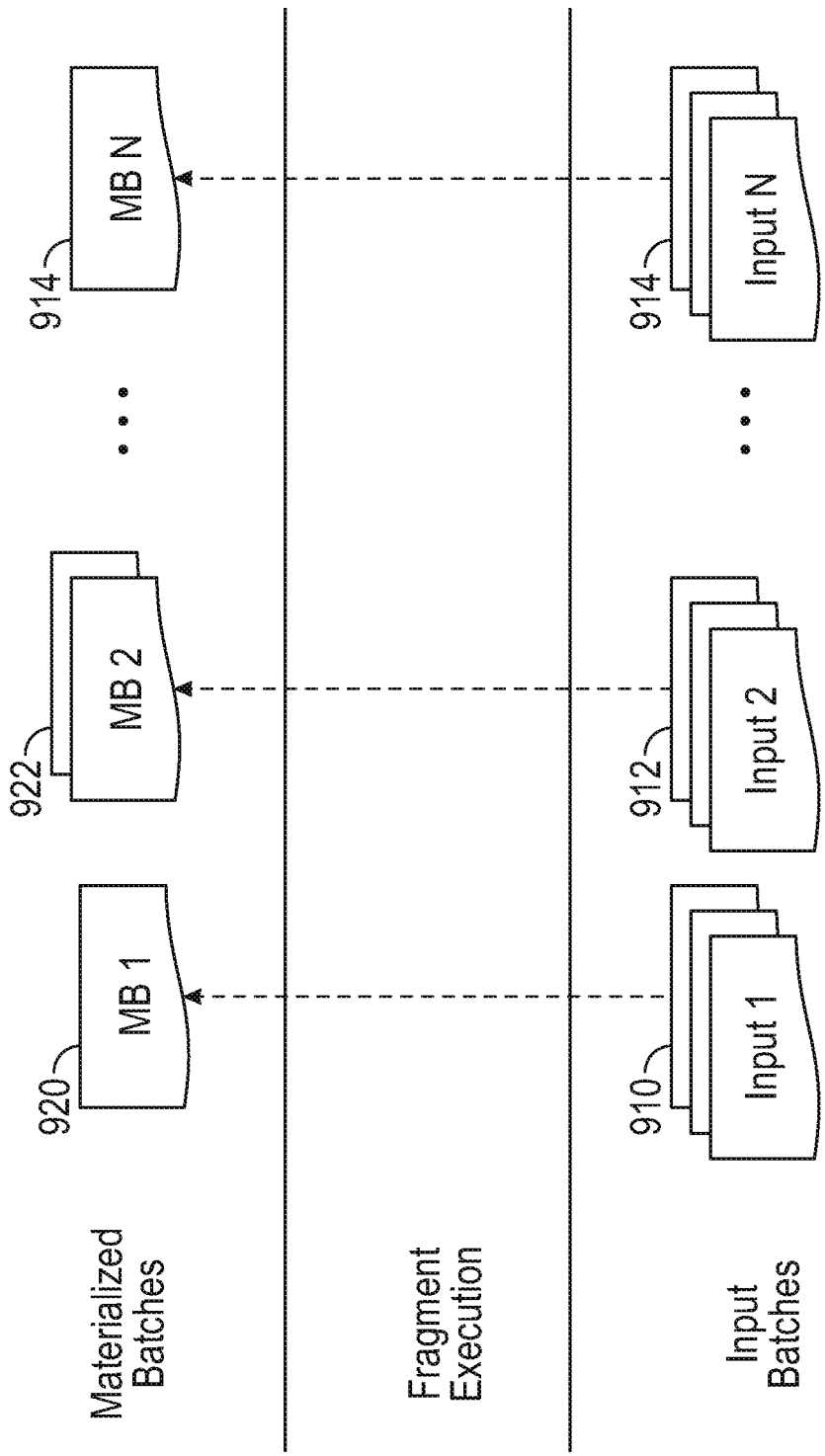
FIG. 9 shows an example of input-to-output mapping, according to some example embodiments.

FIG. 9 shows an example of an input-to-output mapping, according to some example embodiments. Illustrated here are input batches 910, 912, 914 are illustrated. Each input batch 910, 912, 914 may include one or more files of a continuous scanset, as described herein. The input batches 910, 912, 914 may be processed using fragment execution by one or more fragment computing resources. The output of the fragment execution may be provided as MR files (also referred to as materialized batches (MB)) 920, 922, 924. An MR file may include only the output of the processing of a specific input batch. For example, MB 920 may include results of the processing of files in the input batch 910, and MB 922 may include results of the processing of files in the input batch 912, and so on. If an input batch is large and the output does not fit into one MR file, the output may be divided into several MR files, referred to as a materialized batch (MB). However, each MR file in a MB may contain results for just one input batch.

Techniques for ensuring that each materialized result file contains data from only one input batch will be described next. These tracking techniques can provide valuable metadata information such as which input batches have been successfully processed and have generated materialized results, and associating respective materialized results to specific input batch(es). This information may allow fast and efficient recovery of a computing resource failure, for example by rescheduling the corresponding input batch, as opposed to processing all files again.

To ensure the correct input batch to materialized results relationship, row set operator (RSO) links may be designed to be local-synchronous. That is, all data from an input batch may be contained within one RSO thread and may not interfere with other threads. This may be performed by using a local aggregator operator, as described herein. Moreover, barriers may be erected to separate data from different input batches. These barriers may be accomplished with the use of checkpoints and staging areas, as described in further detail below.

Figure 10:
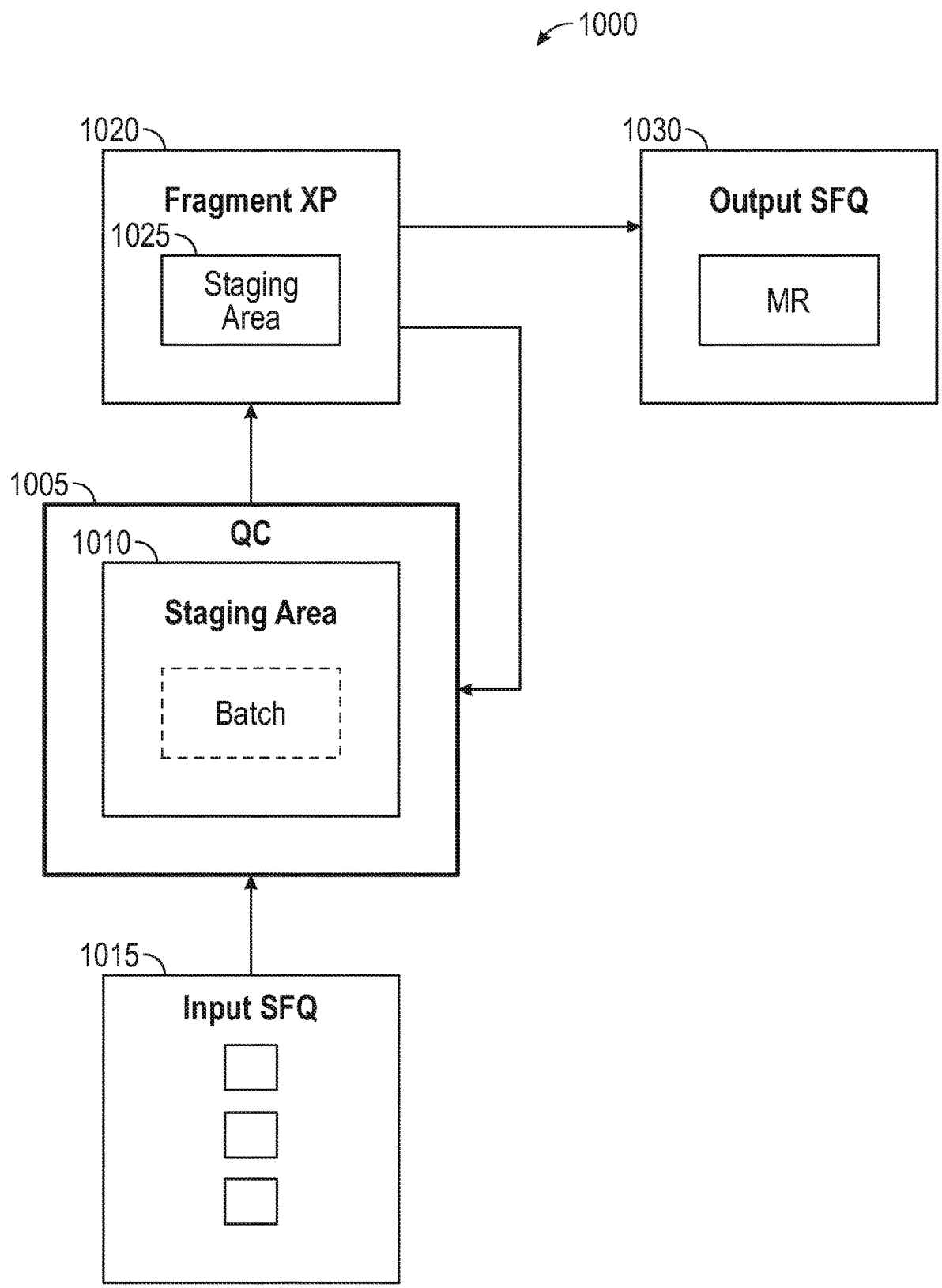
FIG. 10 is a block diagram of a fragment processing system, according to some example embodiments.

FIG. 10 shows an example of a fragment processing system 1000, according to some example embodiments. The fragment processing system 1000 may include a QC 1005 with a QC staging area 1010, an input SFQ 1015, a fragment computing resource 1020 with a fragment staging area 1025, and an output SFQ 1030. The QC 1005 may coordinate and schedule jobs on the fragment computing resource 1020. When the fragment computing resource 1020 is available to perform fragment processing, the QC 1005 may request files from the input SFQ 1015.

As explained above, the requested files may be grouped in a batch and the batch may be assigned a unique batch ID. The batch may be placed in the QC staging area 1010. There, metadata, such as the batch ID along with the list of files in the batch, may be stored. The QC 1005 may transfer the batch with the unique batch ID to the fragment computing resource 1020. The fragment computing resource 1020 may place the batch in its fragment staging area 1025. The fragment computing resource 1020 may include a staging area per thread. Each fragment computing resource 1020 may include a plurality of execution threads (for example, eight execution threads). In an embodiment, the number of threads may correspond to the number of processing cores of the fragment computing resource. Each thread may have its own pipeline and work in parallel within the computing resource.

The batch ID and the list of files in the batch may be stored in the fragment staging area 1025. The fragment computing resource 1020 may process the batch (e.g., execute a set of operators in a fragment plan).

As explained in further detail below, checkpoints may be employed in the operators to maintain separation of data from different batches. After the last operation is performed, a checkpoint signal may be received by the fragment staging area 1025. The fragment staging area 1025 may finalize the processed batch. Also, the output of the processing may be uploaded to a storage area (e.g., cloud storage) and file lists (e.g., URLS) may be uploaded to the output SFQ 1030 in the form of materialized result file lists. In an embodiment, the files may be uploaded on a rolling basis. The fragment staging area 1025 may also associate the materialized files with the corresponding input batch and store that information as metadata. After all of the materialized result files have been uploaded and the batch is finalized, the batch may be considered finished.

A file batch registration request may be sent from the fragment computing resource 1020 to the QC 1005. In an embodiment, the file batch registration request may be provided in a JavaScript Object Notation (JSON) format.

Hence, if a file batch registration request is not received for a particular batch, the information for that batch ID remains in the QC staging area 1010. Consequently, QC 1005 may reschedule that batch's processing. In an embodiment, to avoid possible duplication of results, the QC 1005 may assign that batch a new, different unique batch ID before rescheduling it. In another embodiment, the QC 1005 may direct the processing of that batch to be performed by a parent computing resource rather than a fragment computing resource.

As discussed herein, execution of a fragment is performed through operators. Barriers to segregate data from different input batches may be operator specific. For example, some operators, such as filter and projection operators, may be stateless and thus may not implement barriers. Other operators, such as table scan, aggregate, and insert operators, are not stateless and may implement barriers to segregate data from different input batches. Upon receipt of a checkpoint signal, the states of these operators may be flushed. The form of the barriers may differ based on the operators.

Figure 11:
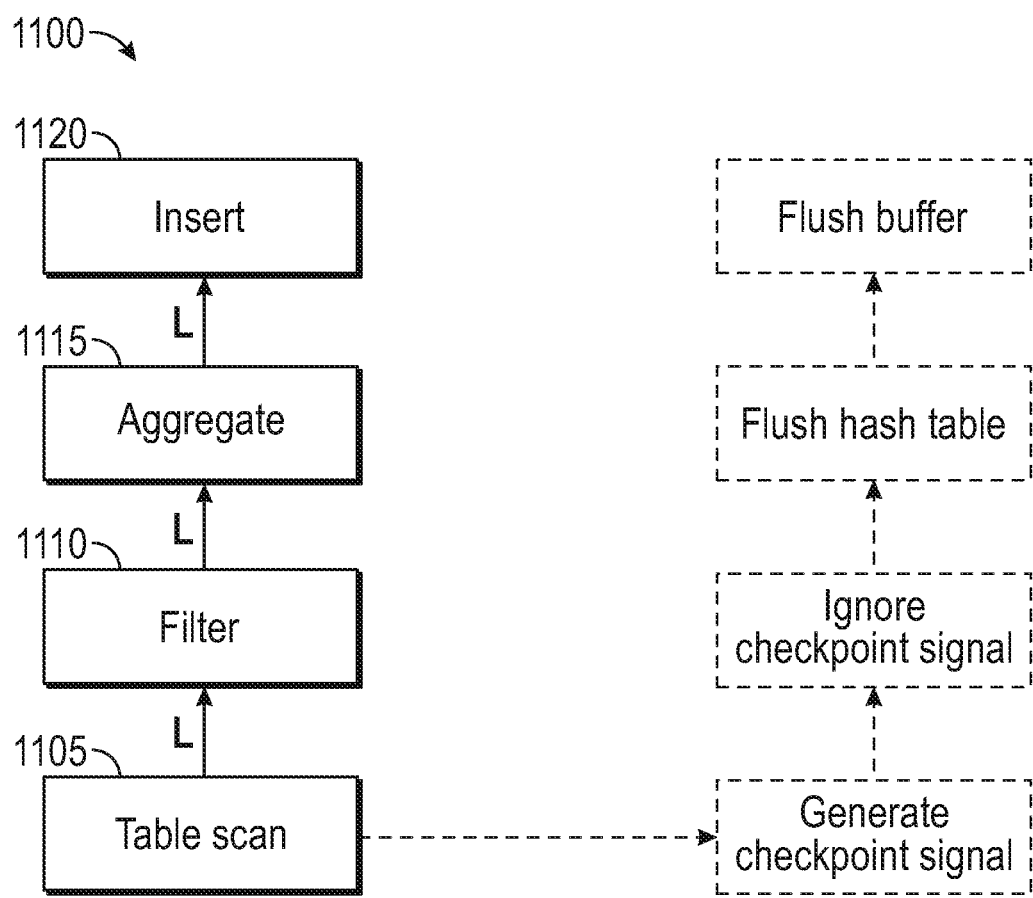
FIG. 11 shows an example of a fragment plan using checkpoints, according to some example embodiments.

FIG. 11 illustrates an example fragment plan 1100 using checkpoints, according to some example embodiments. The fragment plan 1100 may include a plurality of operators to execute the fragment plan by a fragment computing resource: a table scan operator 1105, a filter operator 1110, an aggregation operator 1115, and an insert operator 1120. ith respect to the table scan operator 1105 asynchronous scanners, using checkpoints, may halt until all scanners are out of files before requesting more files (or batch) from the QC. After the asynchronous scanners have scanned all files in a batch, a checkpoint signal is generated and propagated to the remaining downstream operators with local distribution. Each execution thread may spawn one or more asynchronous scanners. For the purpose of creating barriers, asynchronous scanners may only interfere with fellow scanners spawned from the same execution thread.

The filter operator 1110 may be stateless, so no checkpoint alterations may be needed and the checkpoint signal may be ignored. The aggregation operator 1115, on the other hand, may not be stateless and may maintain a local hashtable. Using checkpoints, that local hashtable may be flushed between batches. That is, the aggregation operator 1115 may receive the checkpoint signal and, in response, flush its data through the output link, clearing the hashtable. The insert operator 1120 may buffer data until it receives sufficient data to fill an output file (e.g., a new materialized result file). As explained in further detail below, the buffer may be flushed when it receives checkpoint signal at the end of each batch.

Figure 12:
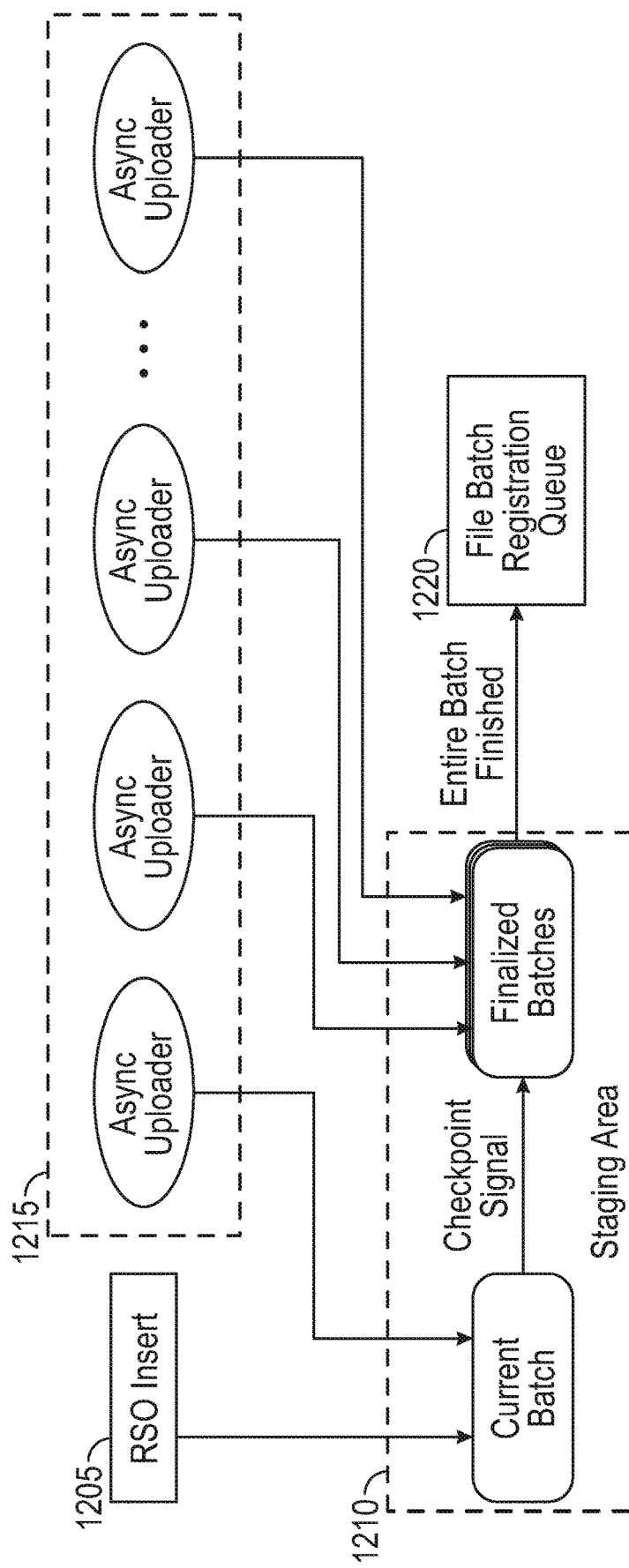
FIG. 12 is a block diagram of a fragment processing environment, according to some example embodiments.

FIG. 12 shows an example fragment processing environment with a staging area, according to some example embodiments. The environment may include a RSOInsert operator 1205, a fragment staging area 1210, asynchronous uploaders 1215, and a file batch registration queue 1220. As discussed above, the fragment computing resource may include a staging area per RSO thread and a file batch registration queue shared by all RSO threads.

The RSOInsert operator 1205 may buffer metadata for the current batch (as shown), which is placed in the fragment staging area 1210. That is, the RSOInsert operator 1205 may add data to the MR file(s) for the current batch. Upon receiving the checkpoint signal, the fragment staging area 1210 may finalize the current batch. The asynchronous uploaders 1215 may then upload the MR files to the storage area and the MR file lists to the output SFQ. After all the MR file have been uploaded, the current batch may be considered finished. Next, the metadata with the batch ID for the finished batch may be placed in the file batch registration queue, and the data for the current batch in the fragment staging area 1210 may be cleared or erased.

The file batch registration queue 1220 may receive the metadata for the MR file(s) and their corresponding batch ID. The file batch registration queue may then send a file batch registration request to the QC with information relating to the MR file(s) and their corresponding batch ID. The QC may register the files and then delete the batch ID from its staging area. In an embodiment, all MR files in a MB may be registered in the same request.

In an embodiment, the file batch registration queue 1220 may have a threshold number before it sends the file batch registration request. For example, consider the example where the file batch registration queue 1220 has a threshold of ten files before it can send a file batch registration request. The file batch registration queue 1220 may receive five MR files, all corresponding to Batch ID 1. However, since five is less than ten, it may not send a file batch registration request at this time because it has reached its ten-file threshold. Subsequently, it may receive an additional five MR files, all corresponding to Batch ID 2. Now the file batch registration queue 1220 has reached its ten-file threshold. Therefore, the file batch registration queue 1220 may send a file batch registration request with the ten files, with five being identified for Batch ID 1 and the other five being identified for Batch ID 2.

In an embodiment, the fragment staging area 1210 may be jointly owned by the RSOInsert operator 1205 and the asynchronous uploaders 1215. Counters may be employed by each owner to determine the status of the current batch. For example, the RSOInsert operator 1205 may initially own the new batch, and each time a new MR file is composed, a counter may be incremented. At this time, the asynchronous uploaders 1215 may take joint ownership, and each time an MR file has finished uploading, the counter may be decremented. After the checkpoint signal is received, the RSOInsert operator 1205 may finalize the batch and release its ownership. Then, once the counter reaches zero (or negative 1), the current batch may be considered finished since all files would have been uploaded by the asynchronous uploaders 1215. The asynchronous uploaders 1215 may release their ownership, and the data in the fragment staging area 1210 may be deleted after it has been placed in the file registration queue as described above.

Figure 13:
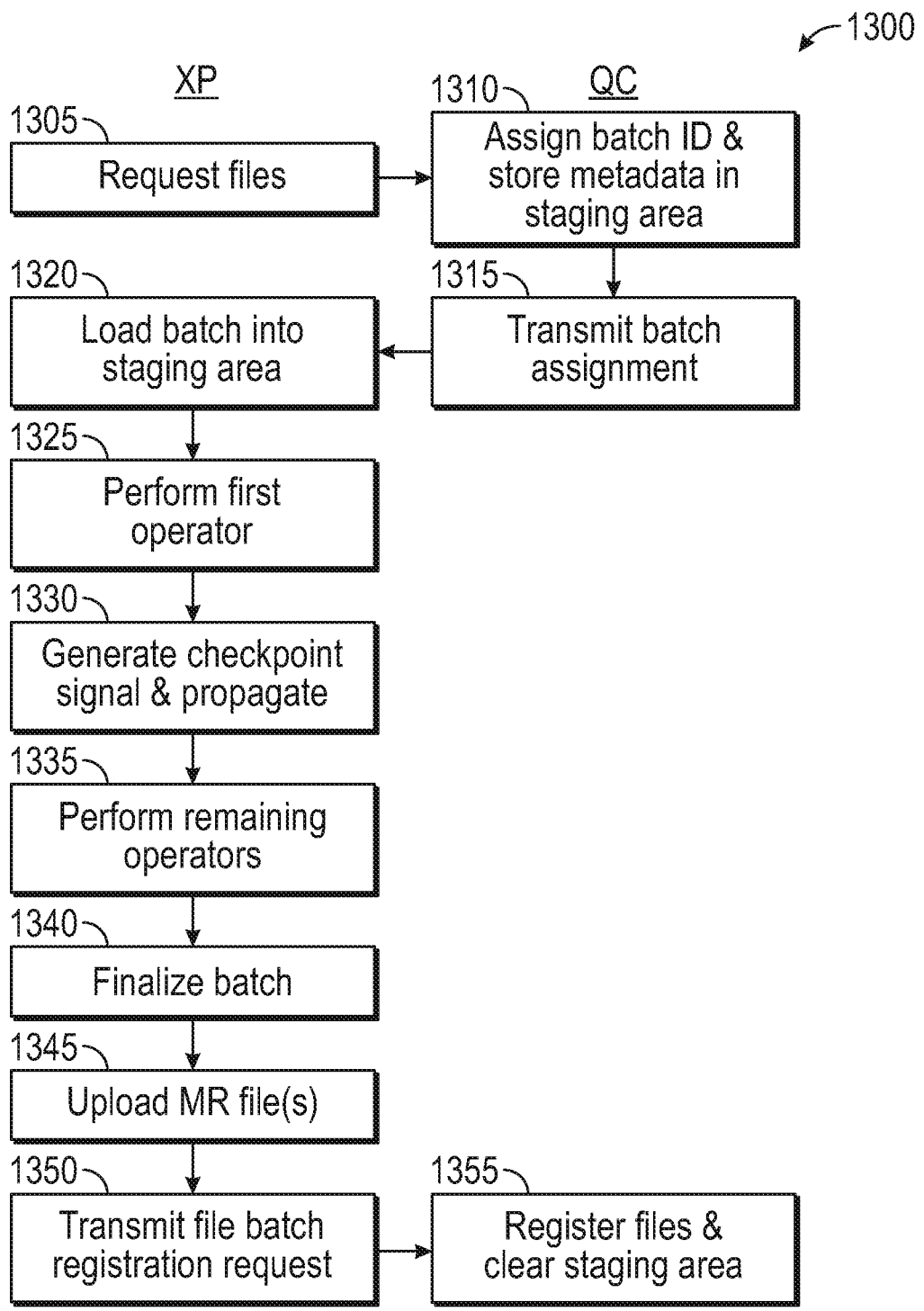
FIG. 13 shows a flow diagram for tracking batch processing, according to some example embodiments.

FIG. 13 shows a flow diagram of a method 1300 for tracking input batches to output materialized results, according to some example embodiments. As shown, portions of the method 1300 may be executed by a QC and a fragment computing resource (e.g., execution platform (XP)).

At operation 1305, the fragment computing resource may request files from the QC. For example, the fragment computing resource may request files through a REST API or the like. At operation 1310, the QC, in response, may retrieve a batch of files from an input SFQ, assign that batch a unique batch ID, and store metadata for the batch including the batch ID and list of files in the batch in a QC staging area. In an embodiment, if a parent computing resource requests files, the QC may not employ the QC staging area; in that embodiment, the QC staging area may be utilized for files requested by fragment computing resources. At operation 1315, the QC may send the batch assignment to the requesting fragment computing resource.

At operation 1320, the fragment computing resource may load the metadata for that batch in its staging area. At operation 1325, the fragment computing resource may perform the first operator of a fragment plan on the files in the batch. For example, the first operator in the fragment query plan may be a table scan operation, so the fragment computing resource may perform a table scan operation. At operation 1330, upon completion of the first operator in the fragment plan, a checkpoint signal may be generated and may be propagated to the downstream operators in the fragment plan.

At operation 1335, the remaining parts of the fragment plan may be executed, with each operator receiving the checkpoint signal and taking appropriate actions if needed (e.g., flushing states). At operation 1340, upon the last operator of the fragment plan being performed and the checkpoint signal being received at the last operator, the batch may be finalized. At operation 1345, all MR file(s) may be uploaded to a storage area and the file lists for the MR file(s) may be uploaded to the output SFQ (e.g., via file registration). In an embodiment, the MR file(s) may be uploaded on a rolling basis. That is, the MR file(s) may be uploaded as they finish, and some MR file(s) may be uploaded before the batch is finalized.

At operation 1350, the metadata of the MR file(s) may be sent to a file batch registration queue, and a file batch registration request may be transmitted to the QC. For example, the file batch registration request may be sent through a REST API or the like. The file batch registration request may include information relating to the MR file(s) and their corresponding batch ID. For example, each single-file registration request may contain the batch ID to which it corresponds. In an embodiment, a list of batch IDs may be added to the request to ensure that batches that produced empty outputs are also accounted for. At operation 1355, the QC may register the files in the file batch registration request. Also, the QC may erase the information stored in its staging area regarding the batch.

The tracking techniques described herein assist in fault and error recovery. A QC may check the status of a computing resource in a variety of ways. For example, if a computing resource is operating, the computing resource may provide its operational status to the QC. In the event the computing resource crashes, the QC may detect the crash.

Also, the computing resource may send periodic heartbeat status checks to the QC, and if the QC does not receive a heartbeat status check for a specified time, the QC may determine an error occurred in the computing resource. Therefore, if the QC detects an error or a crash in the computing resource, the QC may employ the tracking techniques described herein (e.g., using batch IDs, staging areas, and/or checkpoints) to determine which particular batch or files to reschedule without having to repeat performance of entire jobs.

Moreover, although some embodiments of the tracking techniques described herein were discussed in the fragment processing context, the tracking techniques described herein are not limited to fragment processing and can be used in other applications. For example, the tracking techniques described herein may be used in large insert operations. A large insert operation may be divided into batches, and the tracking techniques described herein may provide mapping of input batches and output files. Thus, if processing of one particular batch fails, the system may not have to repeat the entire large insert operation, but rather only the failed batch. Hence, the tracking techniques described herein may identify which output batch files are usable and which ones may need to be redone in the event of some error. The tracking techniques described herein may also be used in any suitable application, such as large data manipulation language (DML) operations or multiple step query plans or the like.

Figure 14:
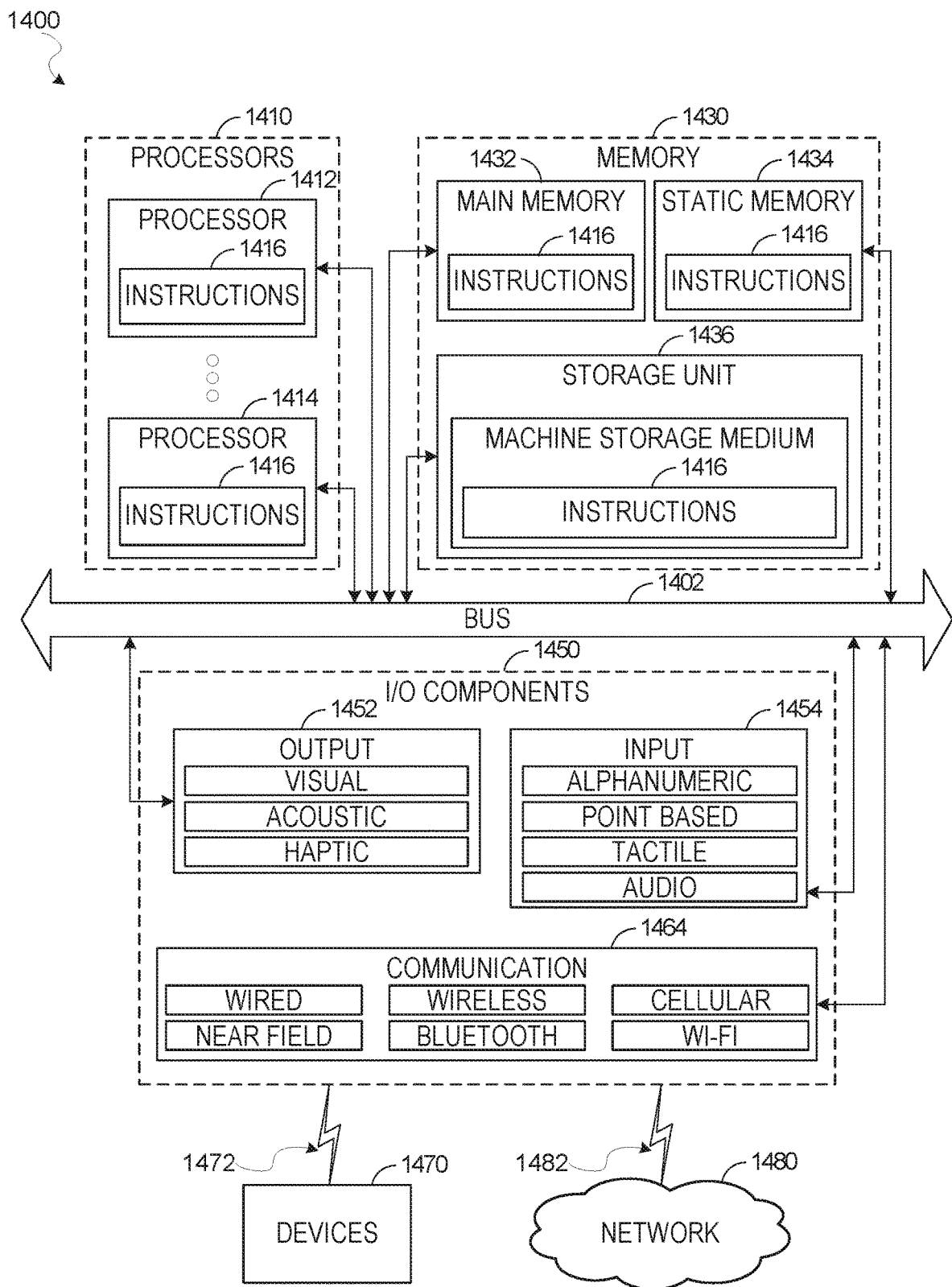
FIG. 14 illustrates a diagrammatic representation of a machine in the form of a computer system within which a set of instructions may be executed for causing the machine to perform any one or more of the methodologies discussed herein, in accordance with some embodiments of the present disclosure.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute any one or more operations of any one or more of the methods described herein. As another example, the instructions 1416 may cause the machine 900 to implemented portions of the data flows described herein. In this way, the instructions 1416 transform a general, non-programmed machine into a particular machine 1400 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 includes processors 1410, memory 1430, and input/output (I/O) components 1450 configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors 1410 that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 include components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1450 may include communication components 964 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, and other communication components to provide communication via other modalities. The devices 1470 may be another machine or any of a wide variety of peripheral devices (e.g., a peripheral device coupled via a universal serial bus (USB)). For example, as noted above, the machine 900 may correspond to any one of the remote computing device 106, the access management system 110, the compute service manager 112, the execution platform 114, the access management system 118, the Web proxy 120, and the devices 1470 may include any other of these systems and devices.

The various memories (e.g., 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1

A method comprising: receiving, by one or more processors, a request from a computing resource for one or more files to process; grouping a set of files from a shared file queue into a batch; assigning the batch a unique batch ID; storing, in a first staging area, the unique batch ID and information related to the batch; assigning the batch to the computing resource; receiving a file registration request from the computing resource, the file registration request including the unique batch ID and indicating that the batch has been processed; and at the computing resource: upon receiving the assignment of the batch, storing the unique batch ID and information related to the batch in a second staging area; performing a first operator on the batch; upon performance of the first operator, generating a checkpoint signal; performing a second operator on the batch; and upon receiving the checkpoint signal at the second operator, finalizing the stored information in the second staging area.

Example 2

The method of example 1, further comprising: deleting the unique batch ID and information related to the batch stored in the first staging area; at the computing resource: transmitting an output file associated with the batch; generating the file registration request; and deleting the unique batch ID and information related to the batch stored in the second staging area.

Example 3

The method of any of examples 1-2, wherein the first operator includes a table scan operator.

Example 4

The method of any of examples 1-3, wherein the second operator includes an insert operator.

Example 5

The method of any of examples 1-4, wherein the output file is a materialized result file and wherein the materialized result file is transmitted to another shared file queue.

Example 6

The method of any of examples 1-5, wherein the output file includes data corresponding only to the batch and no other batch.

Example 7

The method of any of examples 1-6, further comprising: storing, in the first staging area, information related to a second batch including a unique batch ID for the second batch; and upon not receiving a second file registration request associated with the second batch, rescheduling processing of the second batch based on the information related to the second batch stored in the first staging area.

Example 8

The method of any of examples 1-7, wherein rescheduling processing of the second batch includes assigning the second batch a different unique batch ID.

Example 9

The method of any of examples 1-8, wherein the file registration request includes information about an output file for the batch.

Example 10

A system comprising: one or more processors of a machine; and a memory storing instructions that, when executed by the one or more processors, cause the machine to perform operations implementing any one of example methods 1 to 9.

Example 11

A machine-readable storage device embodying instructions that, when executed by a machine, cause the machine to perform operations implementing any one of example methods 1 to 9.

What is claimed is:
1. A method comprising:
at a query coordinator:
receiving, by one or more processors, a request from a computing resource for one or more files to process;
grouping a set of files from a shared file queue into a batch;
assigning the batch a unique batch ID;
storing, in a first staging area, the unique batch ID and information related to the batch;
assigning the batch to the computing resource;
receiving a file registration request from the computing resource, the file registration request including the unique batch ID and indicating that the batch has been processed; and
at the computing resource:
upon receiving the assignment of the batch, storing the unique batch ID and information related to the batch in a second staging area;
performing a first operator on the batch;
based on performing the first operator, generating a checkpoint signal;
determining a state condition of a second operator;
based on the state condition of the second operator, performing the second operator and passing the checkpoint signal to a third operator;
determining a state condition of the third operator;
based on the state condition of the third operator, clearing data associated with the third operator and performing the third operator;
finalizing the stored information in the second staging area;
generating a materialized result file as an output file associated with the batch;
uploading the materialized result file to a storage area from where the materialized result file is accessible to be scanned by the query coordinator; and
uploading a listing of the materialized result to an output shared file queue.

2. The method of claim 1, further comprising:
deleting the unique batch ID and information related to the batch stored in the first staging area;
at the computing resource:
transmitting the output file associated with the batch;
generating the file registration request; and
deleting the unique batch ID and information related to the batch stored in the second staging area.

3. The method of claim 1, wherein the first operator includes a table scan operator.

4. The method of claim 1, wherein the third operator includes an insert operator.

5. The method of claim 2, wherein the output file includes data corresponding only to the batch and no other batch.

6. The method of claim 1, further comprising:
storing, in the first staging area, information related to a second batch including a unique batch ID for the second batch; and
upon not receiving a second file registration request associated with the second batch, rescheduling processing of the second batch based on the information related to the second batch stored in the first staging area.

7. The method of claim 6, wherein rescheduling processing of the second batch includes assigning the second batch a different unique batch ID.

8. The method of claim 1, wherein the file registration request includes information about an output file for the batch.

9. A system comprising:
one or more processors of a machine; and a memory storing instructions that, when executed by the one or more processors, cause the machine to perform operations comprising:

at a query coordinator:

receiving a request from a computing resource for one or more files to process;

grouping a set of files from a shared file queue into a batch;

assigning the batch a unique batch ID;

storing, in a first staging area, the unique batch ID and information related to the batch;

assigning the batch to the computing resource;

receiving a file registration request from the computing resource, the file registration request including the unique batch ID and indicating that the batch has been processed; and at the computing resource:

upon receiving the assignment of the batch, storing the unique batch ID and information related to the batch in a second staging area;

performing a first operator on the batch;

based on performing the first operator, generating a checkpoint signal;

determining a state condition of a second operator;

based on the state condition of the second operator, performing the second operator and passing the checkpoint signal to a third operator;

determining a state condition of the third operator;

based on the state condition of the third operator, clearing data associated with the third operator and performing the third operator;

finalizing the stored information in the second staging area;

generating a materialized result file as an output file associated with the batch;

uploading the materialized result file to a storage area from where the materialized result file is accessible to be scanned by the query coordinator; and uploading a listing of the materialized result to an output shared file queue.

10. The system of claim 9, the operations further comprising:

deleting the unique batch ID and information related to the batch stored in the first staging area;

at the computing resource:

transmitting the output file associated with the batch;

generating the file registration request; and deleting the unique batch ID and information related to the batch stored in the second staging area.

11. The system of claim 9, wherein the first operator includes a table scan operator.

12. The system of claim 9, wherein the third operator includes an insert operator.

13. The system of claim 10, wherein the output file includes data corresponding only to the batch and no other batch.

14. The system of claim 9, the operations further comprising:

storing, in the first staging area, information related to a second batch including a unique batch ID for the second batch; and upon not receiving a second file registration request associated with the second batch, rescheduling processing of the second batch based on the information related to the second batch stored in the first staging area.

15. The system of claim 14, wherein rescheduling processing of the second batch includes assigning the second batch a different unique batch ID.

16. The system of claim 9, wherein the file registration request includes information about an output file for the batch.

17. A machine-storage medium embodying instructions that, when executed by a machine, cause the machine to perform operations comprising:

at a query coordinator:

receiving a request from a computing resource for one or more files to process;

grouping a set of files from a shared file queue into a batch;

assigning the batch a unique batch ID;

storing, in a first staging area, the unique batch ID and information related to the batch;

assigning the batch to the computing resource;

receiving a file registration request from the computing resource, the file registration request including the unique batch ID and indicating that the batch has been processed; and at the computing resource:

upon receiving the assignment of the batch, storing the unique batch ID and information related to the batch in a second staging area;

performing a first operator on the batch;

based on performing the first operator, generating a checkpoint signal;

determining a state condition of a second operator;

based on the state condition of the second operator, performing the second operator and passing the checkpoint signal to a third operator;

determining a state condition of the third operator;

based on the state condition of the third operator, clearing data associated with the third operator and performing the third operator;

finalizing the stored information in the second staging area;

generating a materialized result file as an output file associated with the batch;

uploading the materialized result file to a storage area from where the materialized result file is accessible to be scanned by the query coordinator; and uploading a listing of the materialized result to an output shared file queue.

18. The machine-storage medium of claim 17, further comprising:

deleting the unique batch ID and information related to the batch stored in the first staging area;

at the computing resource:

transmitting the output file associated with the batch;

generating the file registration request; and deleting the unique batch ID and information related to the batch stored in the second staging area.

19. The machine-storage medium of claim 17, wherein the first operator includes a table scan operator.

20. The machine-storage medium of claim 17, wherein the third operator includes an insert operator.

21. The machine-storage medium of claim 18, wherein the output file includes data corresponding only to the batch and no other batch.

22. The machine-storage medium of claim 17, further comprising:

storing, in the first staging area, information related to a second batch including a unique batch ID for the second batch; and upon not receiving a second file registration request associated with the second batch, rescheduling processing of the second batch based on the information related to the second batch stored in the first staging area.

23. The machine-storage medium of claim 22, wherein rescheduling processing of the second batch includes assigning the second batch a different unique batch ID.

24. The machine-storage medium of claim 17, wherein the file registration request includes information about an output file for the batch.

* * * * *